United States Patent [19]

Wolfe

[11] 4,197,760
[45] Apr. 15, 1980

[54] MANUAL SHIFT CONTROL SYSTEM FOR A MULTIPLE INPUT-MULTIPLE OUTPUT TRANSMISSION

[75] Inventor: Robert W. Wolfe, Jackson, Mich.

[73] Assignee: Clark Equipment Company, Buchanan, Mich.

[21] Appl. No.: 27,126

[22] Filed: Apr. 4, 1979

Related U.S. Application Data

[62] Division of Ser. No. 853,072, Nov. 21, 1977, Pat. No. 4,155,271.

[51] Int. Cl.² ............................ G05G 9/12; G05G 5/10
[52] U.S. Cl. .................................... 74/477; 74/337.5; 74/473 R
[58] Field of Search .................. 74/337.5, 473 R, 477, 74/567, 88

[56] References Cited

U.S. PATENT DOCUMENTS

| | | | |
|---|---|---|---|
| 1,118,389 | 11/1914 | Austin | 74/359 |
| 1,928,782 | 10/1933 | Church | 74/59 |
| 3,429,194 | 2/1969 | Espenschield et al. | 74/337.5 |
| 3,431,791 | 3/1969 | Labat | 74/473 R |
| 3,487,713 | 1/1970 | Sturmer | 74/473 R |
| 3,857,299 | 12/1974 | Morrison | 74/473 R |

FOREIGN PATENT DOCUMENTS

| | | |
|---|---|---|
| 1176536 | 1/1970 | United Kingdom . |
| 1238912 | 7/1971 | United Kingdom . |
| 1306117 | 2/1973 | United Kingdom . |

*Primary Examiner*—Allan D. Herrmann
*Attorney, Agent, or Firm*—Mack L. Thomas

[57] ABSTRACT

In combination with a transmission having both multiple input and output portions, each of which contains a plurality of speed change gears, is a manual shift control system having pluralities of both input and output shift rails that are adapted to cooperate with input and output cam shafts that extend through shift rail input and output cam shaft cutouts, with one or both cam shafts having at least one one-way cam which may be in combination with one or both of a two-way cam and an interlock cam, said one-way and two-way cams being adapted to cooperate with one-way and two-way cam follower surfaces, respectively, to effect bidirectional and unidirectional movement of the respective shift rails upon oscillation of the cam shafts, with the cam follower surfaces also being adapted to alternately cooperate with the interlock cams to arrest all but the selected ones of the input and output shift rails against axial movement. Details of actuating means and mechanical interlock means are also set forth.

6 Claims, 14 Drawing Figures

FIG. 3

FIG. 4
SHIFT PATTERN

FIG. 10 though 4,197,760

MANUAL SHIFT CONTROL SYSTEM FOR A MULTIPLE INPUT-MULTIPLE OUTPUT TRANSMISSION

This is a division of application Ser. No. 853,072, filed 21 Nov. 1977, now U.S. Pat. No. 4,155,271.

RELATED APPLICATION

A U.S. patent application filed simultaneously herewith in the name of Robert W. Wolfe, Ser. No. 853,073, filed 21 Nov. 77, entitled "Double Oscillating Motion—Single Linear Motion Cam" and assigned to the present assignee.

BACKGROUND OF THE INVENTION

1. Field of the Invention

The field of art to which this invention pertains includes a shift control system in combination with a transmission having a multiple input portion and a multiple output portion, each of which in turn contains a plurality of constant-mesh change speed gears to provide for a plurality of drive ratios in response to movement of an operator's shift lever or the like.

2. Description of the Prior Art

My prior U.S. Pat. No. 4,000,662, which issued on 4 Jan. 1977 and is also assigned to the assignee of the present invention, discloses a highly advantageous form of transmission having a basic structure which provides axially aligned input and output shafts together with a single aligned countershaft as well as first, second and third input gears and a plurality of forward output gears, with one of the forward output gears also being capable of serving as one of the input gears. First, second and third driven countershaft gears are in constant mesh with respective ones of the input gears and each one of a plurality of driving countershaft gears is in constant mesh with a separate one of the forward output gears, with one of the driving countershaft gears also being capable of serving as one of the driven countershaft gears. Multiple clutch means are utilized for selectively drivably connecting the countershaft with one of the input gears and for selectively drivably connecting the output shaft with the countershaft.

The multiple use of most of the gears of this transmission together with the triple input feature and the single countershaft permit utilization of a transmission housing that has but two through bores, and in one embodiment, all of the components for a nine speed forward and three speed reverse transmission can be located completely within a standard five speed forward—one speed reverse transmission housing.

My co-pending application Ser. No. 731,391, filed 12 Oct. 1976, now U.S. Pat. No. 4,068,537, issued 17 Jan. 1978 which again is assigned to the assignee of the present invention, discloses a sophisticated shift control system of the preselector or semi-automatic type wherein shifts between drive ratios are made in response to the movement of an operator's shift lever and the release of the torque on the drive train.

In order to both reduce the complexity and cost of the sophisticated shift control system of my co-pending application, the present invention takes the form of a fully manual shift control system that permits easy shifting by the operator without the necessity, complexity or expense of a power assist.

Prior art transmission control systems related to the present invention include U.S. Pat. Nos. 1,118,389; 1,928,782; 3,487,713; 3,429,194; 3,431,791; and 3,857,299.

SUMMARY OF THE INVENTION

This invention provides a manual control system for shifting a multiple input-multiple output constant-mesh transmission in response to movement of an operator's control lever or the like and, in some instances, of a clutch pedal, to provide for a plurality of separate drive ratios.

More particularly, the manual control system includes a plurality of both input and output shift rails that are used to effect speed changes and are controlled via spaced input and output cam shafts, respectively. One or both of the cam shafts include at least one one-way cam which may be in combination with one or both of a two-way cam and an interlock cam, with all of the cams being selectively spatially arranged on each cam shaft. Every input and output shift rail has axially spaced input and output cam shaft cutouts in alignment with the input and output cam shafts, respectively, so as to permit the transverse passage therethrough of the cam shafts.

The output cam shaft cutouts of the input shift rails, as well as the input cam shaft cutouts of the output shift rails, take the form of clearance cutouts that permit the free lateral passage therethrough of all of the cams as well as permitting the free axial movement of the shift rails without interfering with any cams located within the clearance cutouts. A two-way cam follower surface in a cam shaft cutout is adapted to cooperate with its respective two-way cam to effect axial movement of the respective shift rail in one direction upon clockwise oscillation of the two-way cam and alternately to effect axial movement of the respective shift rail in an opposite direction upon counterclockwise rotation of the two-way cam. The two-way cam follower surfaces are also adapted to alternately cooperate with an interlock cam to arrest the respective shift rail against axial movement upon oscillation of the cams.

A further cam shaft cutout has a one-way cam follower surface adapted to cooperate with its respective one-way cam to effect axial movement of the shift rail in one and the same direction upon both clockwise and counterclockwise oscillation of the one-way cam. These one-way cam follower surfaces are also adapted to alternately cooperate with an interlock cam to arrest the respective shift rails against axial movement upon oscillation of the cams.

The manual control system of this invention also includes means for actuating all of the cams by motion of a hand-actuated shift lever. Furthermore, interlock means cooperate with both the input and output cams for actuating in unison all of the input cams and all of the output cams in a predetermined sequential order. In addition, the pluralities of input and output shift rails are so arranged that the input and output interlock cams cooperate with all but the selected ones of the input and output shift rails, thereby locking all but the selected shift rails against axial movement.

In summary, the manual transmission control system of this invention can be used with a transmission which must have at least two inputs and at least two outputs, with the general arrangement of the shift control system basically consisting of two sets of oscillating cams, one for the input portion and the other for the output portion of the transmission. Both sets of cams are oscillated by motion of a hand-actuated shift lever from a neutral position, in a predetermined sequential order, i.e., all of the output cams followed by all of the input cams or vice versa. For instance, in one example, when moving the hand lever forward from neutral, first the output cams are oscillated rearward followed in sequence by the input control cams oscillating rearward. Centering the hand lever knob back to neutral oscillates the cams back to neutral, first the input cams, then the output cams. This sequential action is provided by an interlock system, with the actuating means causing the cams to move laterally right and left by opposite side or lateral motion of the knob of the shift lever to select the different shift rails. Subsequent axial or longitudinal movement of the shift lever then moves the shift rail to select one of the two transmission settings available in this shift gate.

Several embodiments of both the one-way and two-way cams together with the respective shift rail cutouts and the interlock cams permit the assembly of different combinations so that almost any desired shift pattern can be obtained.

The various features and advantages of this invention will be more readily understood by persons skilled in the art when following the detailed description in conjunction with the several drawings.

DESCRIPTION OF THE PREFERRED EMBODIMENT

Figures 1, 2:
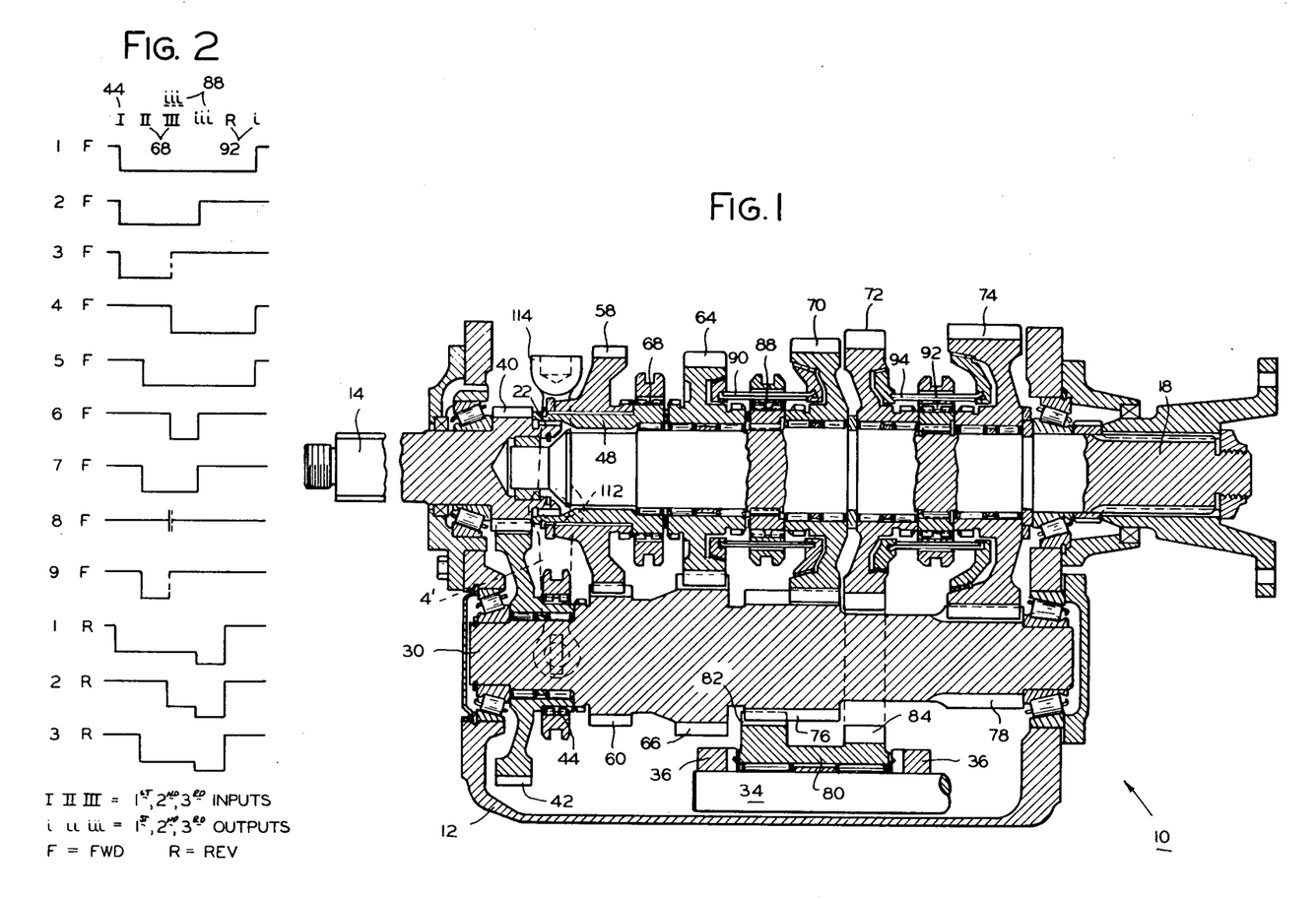
FIG. 1 illustrates a multiple input-multiple output transmission in which the shift control system of this invention finds utility.
FIG. 2 is a schematic showing of the power paths through the transmission in each of the forward and reverse speeds.

Referring now to the drawings in detail, the specific transmission 10 shown in FIG. 1, which can be used with the transmission control system of this invention, is substantially identical to transmission 10 shown in my prior U.S. Pat. No. 4,000,662 that is also assigned to the assignee of this invention. For ease of understanding, however, the structure and function of transmission 10, which has a plurality of constant-mesh change speed gears, will again be described hereinafter.

Transmission 10 includes a casing or housing 12, an input shaft 14 rotatably journalled therein and an output shaft 18 axially aligned with the input shaft and rotatably journalled relative to the input shaft and casing 12. A countershaft 30 is parallel to and vertically displaced below output shaft 18, while a dead shaft 34, parallel to countershaft 30, is fixedly retained in aligned bosses or stub walls 36 in casing 12.

Shaft 14 has a gear 40 affixed thereto or integral therewith, with gear 40 being in constant mesh with gear 42 rotatably journalled on countershaft 30. A conventional dog clutch 34, incorporating a known clutch lock to prevent jumping out of gear, is disposed on the hub of gear 32 and is arranged either to drivably connect gear 32 to countershaft 30 for conjoint rotation therewith, or to occupy a neutral position as shown in FIG. 1.

Input shaft tubular portion 22, which is adjacent the inner axial end of gear 40, has either affixed thereto or integral therewith, one end of the sleeve 48 that coaxially surrounds output shaft 18, with sleeve 48 forming an extension of the input shaft.

Rotatably journalled on sleeve 48 is a gear 58 that is in constant mesh with a further gear 60 integral with or affixed to countershaft 30. Rotatably journalled on output shaft 18, adjacent to the inner end of sleeve 48, is a gear 64 that is in constant mesh with a gear integral with or affixed to countershaft 30. Another conventional clutch 68, such as a dog clutch, and also incorporating a clutch lock, is disposed on sleeve 48 between gears 58 and 64 and is arranged either to drivably connect gear 58 to sleeve 48, or to drivably connect gear 64 to sleeve 48, or to occupy a neutral position as shown in FIG. 1. Thus, basically, it is the function of clutch 68 to connect either of gears 58 and 64 for conjoint rotation with input shaft 14 via sleeve 48. Gears 40, 58 and 64, whose pitch circle diameters differ from one another in a well known manner are thus in constant mesh with gears 42, 60 and 66, respectively, with the utilization of clutches 44 and 68 thus providing three separate inputs to single countershaft 30. The portion of transmission 10 described so far may be designated the "input" portion of this transmission.

Also journalled for rotation on output shaft 18 are gears 70, 72 and 74 whose pitch circle diameters differ from one another in a well known manner, with gears 70 and 74 being in constant mesh, respectively, with gears 76 and 78 affixed to or integral with countershaft 30. Gear 76, which has a greater axial extent than gear 70, is also in mesh with a gear 82 affixed to or forming part of a tubular reverse-idler shaft 80 which in turn is journalled for rotation on dead shaft 34. Gear 72 is in constant mesh with a gear 84 which is affixed to or forms a part of shaft 80.

A further conventional clutch 88, such as a dog clutch, and also incorporating a clutch lock and a known synchromesh device 90, is disposed on output shaft 18, intermediate gears 64 and 70, and is arranged to drivably connect either of these two gears to shaft 18 or to occupy a neutral position as shown in FIG. 1. A similar conventional clutch 92, incorporating a clutch lock and a known synchromesh device 94, is disposed on output shaft 18, intermediate gears 72 and 74, and is arranged to drivably connect either of these gears to shaft 18 or to occupy a neutral position as shown in FIG. 1. A typical prior art synchromesh device is disclosed in U.S. Pat. No. 2,667,955 which issued to L. A. Bixby on 2 Feb. 1954.

Basically, gears 64, 70, 72 and 74, together with gears 66, 76, 82, 84 and 78, may be described as constituting the "output" portion of transmission 10. It should be noted that gears 64 and 66 can alternately function both as input and output gears, as will be explained in more detail as this description progresses.

In operation, transmission 10 has nine forward speeds and as many as three reverse speeds, although not all of the three reverse speeds need be utilized. FIG. 2 is a schematic showing of the various power paths through transmission 10 in each of the forward and reverse speeds. As best seen in FIGS. 1 and 2, transmission 10 can be defined as having a first input via constant mesh gears 40 and 42, with the latter being adapted to be coupled to countershaft 30 via clutch 44, with countershaft 30 rotating in a direction opposite to that of input shaft 14. A second input is provided by constantly meshing gears 58 and 60, with the former being adapted to be coupled to input sleeve 48 via one of the operative positions of clutch 68, thereby causing the rotation of countershaft 30 in a direction opposite to that of input shaft 14. Yet another or third input is provided by constantly meshing gears 64 and 66, with the former being adapted to be coupled to input shaft sleeve 48 via the other operative position of clutch 68, thereby rotating countershaft 30 in a direction opposite that of input shaft 14.

A first forward output from transmission 10 can be defined by constantly meshing gears 78 and 74, with the latter being adapted to be coupled to output shaft 18 via one of the operative positions of clutch 92, thereby rotating output shaft 18 in a direction opposite to that of countershaft 30. A second forward output is defined by constantly meshing gears 76 and 70, with the latter being adapted to be coupled to output shaft 18 via one of the operative positions of clutch 88, thereby rotating output shaft 18 in a direction opposite to that of countershaft 30. Yet another or third forward output is defined by constantly meshing gears 66 and 64, with the latter being adapted to be joined to output shaft 18 via another of the operative positions of clutch 88, thereby again rotating output shaft 18 in a direction opposite to that of countershaft 30.

A reverse output is provided by constantly meshing gears 84 and 72, with the latter being adapted to be coupled to output shaft 18 via another of the operative positions of clutch 92, thereby rotating output shaft 18 in the same direction as countershaft 30 (and in a direction opposite that of input shaft 14).

An analysis of FIG. 2 will show that by utilizing the first input (40,42) together with the first output (78,74) provides a first forward speed. Continuing the use of the first input but utilizing the second (76,70) or third (66,64) outputs will provide second or third forward output speeds. The third input (64,66) together with the first output provides a fourth forward speed, whereas the second input (58,60) with the first output provides a fifth forward speed. The third input together with the second output provides a sixth forward speed whereas the second input together with the second output provides a seventh forward speed. The third input, which can also be the third output, provides an eighth or direct forward drive by utilizing clutch 68 to couple one side of the hub of gear 64 to input shaft sleeve 48 and by utilizing clutch 68 to couple the other side of the hub of gear 64 to output shaft 18. A ninth forward speed is provided by utilizing the second input together with the third output.

Three reverse speeds are available by coupling any of the first, second or third inputs to the reverse output (84,72). While three reverse outputs are possible, it is, of course, not necessary that all three of the speeds be utilized.

Another way of defining the structure and function of transmission 10 is, as best seen in FIG. 2, that the first input is utilized in the first, second and third speeds as well as the first speed in reverse. The second input is utilized for the fifth, seventh and ninth speeds forward as well as the third speed in reverse. The third input is utilized for the fourth, sixth and eighth speeds forward as well as the second speed in reverse. The first output is utilized for the first, fourth and fifth speeds forward, whereas the second output is utilized for the second, sixth and seventh speeds forward. The third output is utilized for the third, eighth and ninth speeds forward, while the reverse output is utilized for the first, second and third speeds in reverse.

While transmission 10 has three inputs and three outputs, it should be noted that when changing from first to second, second to third, fourth to fifth, sixth to seventh and eighth to ninth speeds forward, only one clutch has to be disengaged and one other clutch has to be engaged, whereas in changing from third to fourth, fifth to sixth and seventh to eighth speeds forward, two clutches must be disengaged and two other clutches must be engaged. The shifts between first, second and third reverse speeds require the disengagement of one clutch and the engagement of one other clutch.

Figure 3:
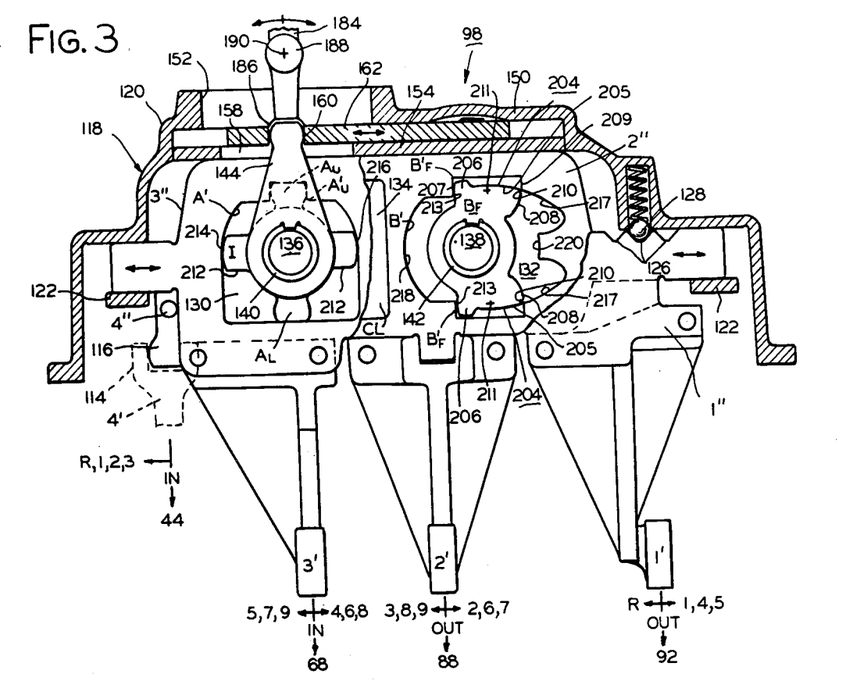
FIG. 3 is a side view, with portions broken away, looking in the direction of arrows 3—3 in FIG. 5, of the transmission control system and more particularly, the manually-actuated control cover of the transmission control system.
Figure 5:
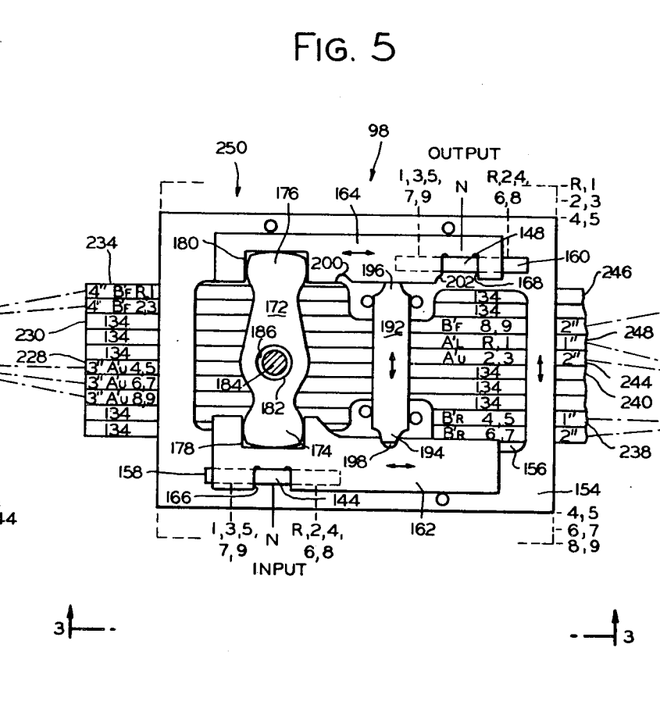
FIG. 5 is a simplified top plan view of the control cover of FIG. 3.

A shift control system, generally designated by numeral 98 and best seen in FIGS. 3 and 5, for manually selecting any of the available power paths through the transmission, includes four shift forks or selector elements 1', 2', 3' and 4'. Shift forks 1', 2' and 3' are rigidly attached to one or more shift rails 1", 2" and 3" as will be explained in more detail as this description progresses. Shift fork 4' (best seen in FIG. 1) is pivotally connected at about its midpoint to casing 12 and has a socket portion 114 attached to a lug member 116 (FIG. 3) which in turn is rigidly connected with one or more shift rails 4". Shift fork 4' operatively engages clutch 44 and operates it in a manner previously described. Similarly, shift forks 1', 2' and 3' operatively engage clutches 92, 88 and 68, respectively. In the interest of simplicity and in order to avoid confusion, the engagement of the shift forks with their respective clutches is not shown, but is accomplished in a manner well known in the art, an example of which is shown in my prior U.S. Pat. No. 4,000,662.

Shift control system 98 includes a control cover 118 whose control cover housing 120 fits over transmission 10 and is rigidly bolted to transmission housing 12. Pluralities of parallel shift rails 1", 2", 3" and 4" are slidably supported in control cover housing 120, for axial movement relative thereto, on support pads 122. Shift rails 1" and 2" which are associated with shift forks 1' and 2', respectively, may be denominated as the output shift rails since they serve to actuate output clutches 92 and 88, respectively. Similarly, shift rails 3" and 4", which are associated with shift forks 3' and 4', respectively, may be denominated as the input shift rails since they serve to actuate input clutches 68 and 44, respectively. Since clutches 68, 88 and 92 have a neutral position and an operative position on either side of neutral, each one of shift rails 1", 2" and 3" is provided with three notches 126 that can cooperate with a spring loaded detent 128 in order to position the shift rails to any one of the three positions. Shift rails 4" are only provided with two notches 126 since clutch 44 has but one operative position in addition to its neutral position.

Each one of the shift rails is provided with two axially spaced shift rail cutouts 130, 132 which may be termed as the input and output cutouts, respectively. Extending through shift rail cutouts 130 and 132 are fixed input and output cam shafts 136, 138, respectively. Slidingly secured on cam shafts 136 and 138, for lateral and oscillating movement, are split tubes or shafts 140 and 142, respectively. Affixed to one end of tube 140, via tang 146, is one end of an input lever 144. Similarly affixed to the other end of split tube 142 is one end of an output lever 148 (best seen in FIGS. 5 and 7).

Control cover housing 120 is provided with a top cover portion 150 having a generally circular opening 152. Located within control cover housing 120, below top cover portion 150, is a laterally movable mounting plate 154 having a large central opening 156 as well as a pair of diagonally spaced longitudinal slots 158 and 160. Slidably secured, for axial movement, on mounting plate 154 are opposed input and output links 162 and 164. Input link 162 has a cutout 166, aligned with mounting plate slot 158, which is adapted to receive the free end of input lever 144. Similarly, output link 164 has a cutout 168, aligned with mounting plate slot 160, which is adapted to receive the free end of output lever 148. Extending across mounting plate central opening 156 is a differential link 172 whose ends 174, 176 are received in opposed cutouts 178, 180 of links 162, 164, respectively. In addition, differential link 172 is provided with an aperture 182 that is adapted to receive the lower ball 186 of a shift lever 184 whose mounting ball 188 is pivoted at 190 for pivotal movement about two perpendicular axes. Also extending across mounting plate central opening 156, and slidably secured for lateral movement on mounting plate 154, is a sequential interlock pin 192 having opposed ends 194 and 196 that are adapted to alternately engage in one of notch 198 in link 162 and in one of axially spaced notches 200, 202 in link 164, respectively.

Figure 8A:
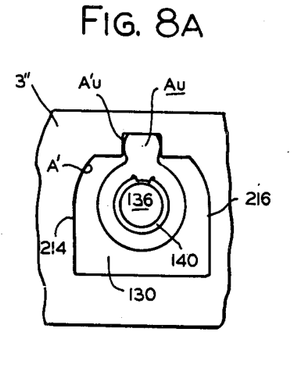
FIGS. 8a,b,c,d illustrate several operational modes of a two-way cam in conjunction with associated cam follower notches.
Figure 8B:
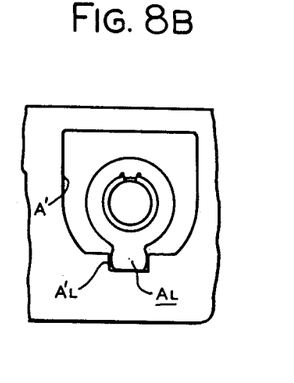
Figure 8C:
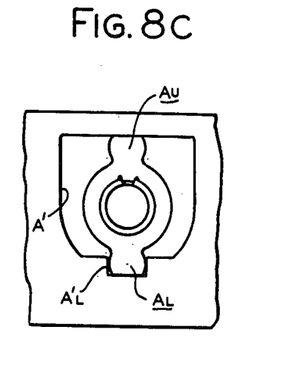
Figure 8D:
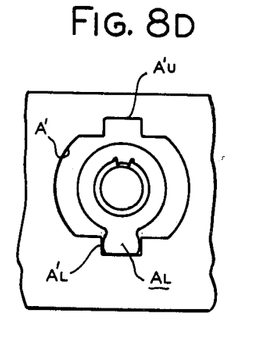

As previously noted, and as best seen in FIG. 3, each one of shift rails 1", 2", 3" and 4" is axially movable, with this movement being accomplished either via a two-way or A cam or a one-way or B cam. An A cam has one or two vertically opposed operating cam surfaces $A_U$ (Upper) or $A_L$ (Lower), one of which will enter a single cam follower notch $A'_U$ or $A'_L$ (either in the upper or lower portion of cam follower inner peripheral surface A' of shift rail cutout 130 or 132), depending on the desired direction of shift rail movement. See FIGS. 8a,b. While there can be both $A_U$ and $A_L$ operating surfaces on one A cam (FIG. 8c), there can be but a single notch, either $A'_U$ or $A'_L$ in surface A' of rail cutouts 130, 132, since otherwise there would be rotation rather than the desired axial movement. Conversely there can be two notches $A'_U$ and $A'_L$ in surface A' of one rail cutout (FIG. 8d) if they are separately alternately actuated by single A cams. The direction of movement of the shift rail can, of course, vertically displace both the cam operating surface and the cam follower notch by 180° Thus, the cams axially actuate the shift rails in a manner akin to cam followers.

Figure 9A:
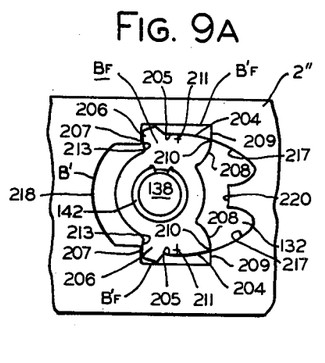
FIGS. 9a,b illustrate two operational modes of a one-way cam in conjunction with associated cam follower notches.
Figure 9B:
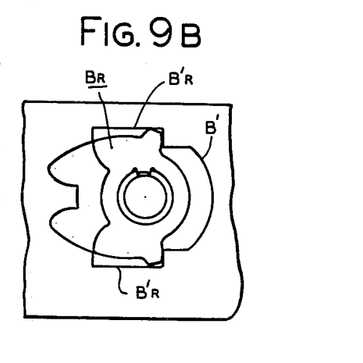

One-way or B cams are unidirectional cams that can be actuated bidirectionally, i.e., either clockwise or counterclockwise, that will move the shift rail in the same direction regardless of the same or opposite directional input and upon centering movement return the cam to neutral position. B cams can be of two types, namely $B_F$ (Front) or $B_R$ (Rear) as best shown in FIGS. 9a,b. Cams $B_F$ and $B_R$ are allochiral in shape with each B cam having identical upper and lower cam operating surfaces 204 which include tooth portions 206, connecting surface 205 and cam end surfaces 208. Surfaces 205 and 208 meet at intersection 210. Center points 211 of cam end surfaces 208 and leading edges 213 of tooth portions 206 are offset relative to the vertical center line of cam shaft 138 (or 136) since a large vertical movement of intersection 210 is necessary to allow the engaging and disengaging of surface 208 with respect to cam follower notches $B'_F$ in both the upper and lower portions of cam follower inner peripheral surfaces B' of shift rail cutouts 130 and 132. Each cam follower notch $B'_F$ has a shift rail advancing surface 207 adapted to cooperate with tooth edge 213 and a shift rail disengaging surface 209 adapted to cooperate with cam end surface 208. For example, in a clockwise actuation of cam $B_F$, the lower cam tooth 206 initially engages shift rail advancing surface 207 of and, upon continued rotation of cam $B_F$, will axially slide the shift rail forwardly or to the left from neutral. As this movement occurs, intersection 210 and lower cam rear surface 208 will also enter lower notch $B'_F$ so that there is basically a rigid mechanical connection between cam $B_F$ and the shift rail, with cam lower rear surface 208 then interacting with shift rail disengaging surface 209 to cause the shift rail to return to neutral upon centering oscillation of the cam. On the other hand, if cam $B_F$ is actuated in the counterclockwise direction, movement of the shift rail will still be forwardly or to the left except that there is interaction between the upper cam surface 206 and the upper notch $B'_F$ in the manner similar to that previously described. The direction of movement of the shift rail can, of course, be reversed by reversing both cam B and cam follower surface B'. As previously noted, each shift rail is provided with two or more notches 126 that cooperate successively with spring loaded detent 128 in order to positively position the shift rail to one of its operating or neutral positions. It is important that each shift rail be positively held in its neutral position in order to avert any unwanted axial movement of the shift rail. For example, it is conceivable that due to unavoidable manufacturing tolerances there could possibly be a hangup of B cam intersections 210 with adjacent arcuate surface portions 217 of cam follower surface B' which could produce the undesired result of locking cam B against rotation.

Figure 10:
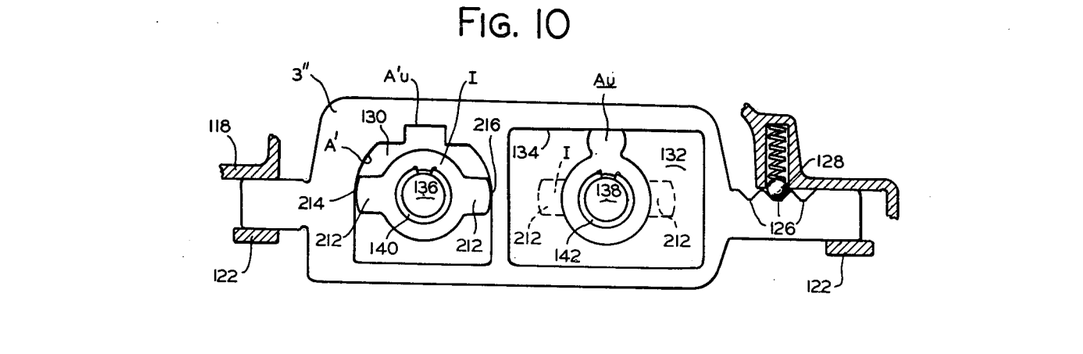
FIG. 10 illustrates a shift rail having an interlock cam positioned within a cam follower surface and a two-way cam positioned within a shift rail clearance cutout.

It should be understood that even though each one of the various shift rails has two shift rail cutouts 130, 132 only one of those cutouts is provided with the necessary cam follower surface and cam follower notches for cooperation with either cam A or B, and the remaining cutout is a clearance cutout 134 (FIG. 10) whose inner peripheral surface dimensions are such as to permit the free lateral passage therethrough of cams A and B as well as to permit the free axial or reciprocal movement of the shift rail without interference with any cams located within the clearance cutout. A portion of clearance cutout 134 is shown in FIG. 3.

Since there are two input clutches 44 and 68 as well as two output clutches 88 and 92, selection and consequent actuation of one of the input and output clutches should be accompanied by interlock of the nonselected ones of the input and output clutches to prevent unwanted actuation thereof. This interlocking function can best be accomplished by an interlock or I cam (FIGS. 3 and 10) which takes the form of a horizontally extending opposed-lobe cam whose lobes 212 are adapted to abut the opposed sides 214, 216 and 218, 220 of cam follower surfaces A' and B', respectively, thereby arresting the associated shift rail against all axial movement. At the same time, however, the location of an I cam in a clearance cutout 134 will still permit free reciprocal axial movement of the shift rail. See FIG. 10.

Each one of cams A, B and I are affixed to split tubes 140 or 142 via tangs and therefore are laterally movable with and oscillate with tubes 140 or 142. If desired, the cams could be mounted directly on cam shafts 136 or 138 if the cam shafts are constructed to be capable of both axial and oscillating movements. A combination of these previously described three types of cams with a sufficient number of shift rails can produce most any desired type of shift pattern, an example of which will now be described.

Figure 4:
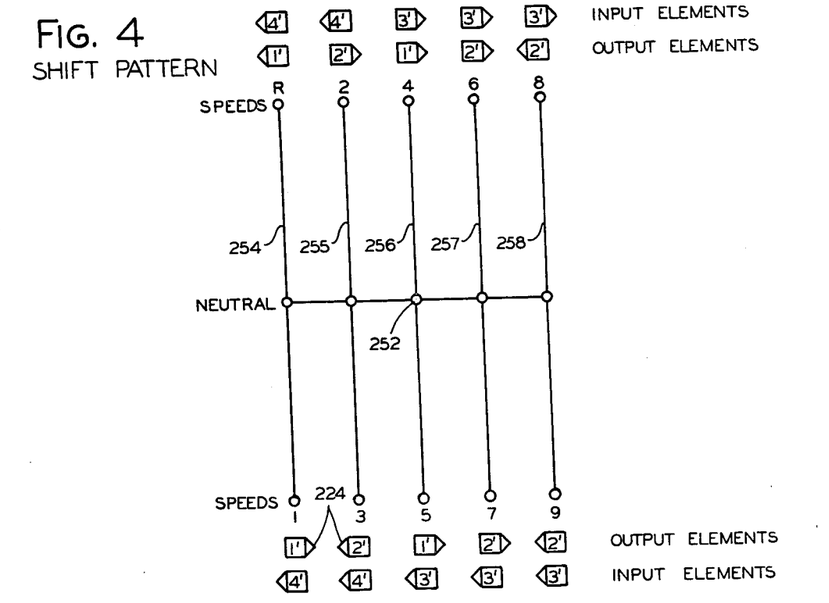
FIG. 4 is a schematic showing of the shift pattern that is achieved via the control system of this invention.

The design of a shift control system for a multiple input-multiple output transmission starts with the drawing up of a desired shift pattern of the type shown in FIG. 4. Thereafter, the positions of both the input and output elements (the shift forks) are determined for each of the shift positions in the shift pattern together with the directional movement, from neutral, of the particular clutch controlled by the particular shift fork to arrive at the desired shift pattern. FIG. 4 also shows, via pointed ends 224, the direction of movement of the selector elements from the neutral position, with shift forks 1', 2' representing the output elements that control output clutches 92 and 88, whereas forks 3' and 4' represent the input elements that control input clutches 68 and 44, respectively.

Once the shift pattern and selector element positions have been established in the manner shown in FIG. 4, then the proper selection of the various shift rails and the necessary types of cams can be determined. For example, looking first at the input portion of transmission 10, since shift fork 4' controls the inputs for speeds 1 and reverse in shift gate 254, as well as the inputs for speeds 2 and 3 in adjacent shift gate 255, two input rails 4" are required for shift fork 4'. A perusal of FIG. 4 will show that the direction of movement of shift fork 4' is the same for speeds 1 and reverse, therefore, a one-way or B cam is required. Since the direction of movement is forward (or to the left), a $B_F$ cam is required. The same reasoning holds for speeds 2 and 3, and, therefore, another $B_F$ cam is required, with the result that a $B_F$ cam is required for each of the two 4" shift rails. Cams $B_F$ must be mounted on input cam shaft split tube 140 since shift fork 4' controls input clutch 44. Naturally, each one of shift rails 4" must have cam follower notches $B'_F$ and the shift rail cutout around output cam shaft 138 must be of clearance type 134.

Shift fork 3' controls inputs for speeds 4,5; 6,7; and 8,9. Therefore, three separate input shift rails 3" are required. Since the direction of movement of shift fork 3' for speeds 4 and 5 is opposite, a two-way or A cam is required. Furthermore, since the direction for speed 4, which is selected first, is to the right (or to the rear), an $A_U$ cam is required because it will first shift to the rear when actuated in one direction and thereafter shift to the front when actuated in the opposite direction. A further analysis of FIG. 4 will show that the remaining two shift rails 3' for speeds 6 and 7, as well as 8 and 9, will also require $A_U$ cams as well as $A'_U$ cam follower notches in shift rail cutouts 130. Again, shift clearance cutouts 134 are required in shift rails 3" around output cam shaft 138.

Shift fork 2' controls the transmission outputs for speeds 2 and 3, also 6 and 7, as well as 8 and 9. Therefore, three shift rails 2" are required, with a $B_R$ cam being necessary for speeds 6 and 7, while a $B_F$ cam is necessary for speeds 8 and 9. Furthermore, and again based on the criteria and reasoning previously set forth, an $A_U$ cam is required for the control of the output elements of speeds 2 and 3.

Shift fork 1', which controls the output element for speeds reverse and 1, as well as 4 and 5, requires two output shift rails 1". Since the direction of movement of shift fork 1' is opposite for speeds reverse and 1, an $A_L$ cam is required. The direction of movement of shift rail 1' for the output elements of speeds 4 and 5 is the same, therefore, a $B_R$ cam is necessary. It should be understood that corresponding cam follower notches are required for coaction with their respective cams, and that shift rail clearance cutouts 134 are required in all output shift rails in the areas around input cam shaft 136. All output cams are arranged on output cam shaft split tube 142.

The actual physical arrangement of these various input and output rails, as well as the physical arrangement of the various A, B and I cams should be accomplished in a manner so as to minimize the required number of cams, i.e., preferably the cams should be used more than once.

Figure 6:
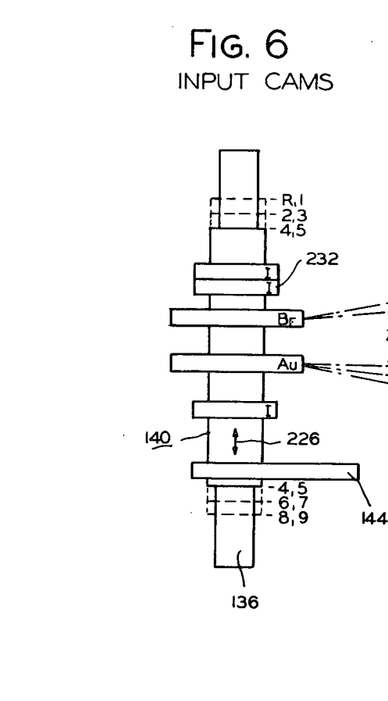
FIG. 6 is a simplified end view of the input cams of the control system of this invention as mounted on an input cam shaft sleeve.
Figure 7:
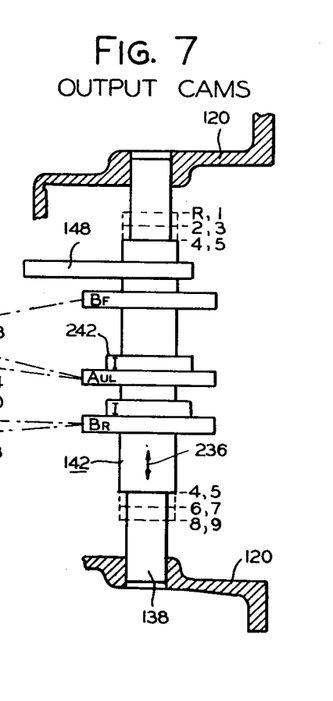
FIG. 7 is a simplified end view of the output cams of the control system of this invention as mounted on an output cam shaft sleeve.

Referring now specifically to FIGS. 5, 6 and 7, FIG. 5 shows an arrangement of pluralities of shift rails 1", 2", 3" and 4" arranged in a manner so as to accomplish the shift pattern set forth in FIG. 4. The left end portion of FIG. 5 shows multiples of input shift rails 3" and 4" together with a notation of each applicable cam follower notch (such as $B'_F$ and $A'_U$) together with the designation of the speeds controlled by the particular shift rail (such as 2, 3 for example). Interaction of the input shift rails with the input cams is shown in phantom line connections with FIG. 6, and it can be seen that a single $B_F$ cam is utilized to actuate both the 4" shift rails, whereas a single $A_U$ cam is utilized to actuate all three of the 3" input shift rails. It should, of course, be understood that all shift rails of one type, such as, for example, all three of shift rails 3", are tied together and move as a unit. FIG. 5 also shows that shift rail clearance cutouts 134 are utilized on all input shift rails at the output cam shaft location and similar cutouts 134 are utilized on all output shift rails at the input cam shaft location in order to permit free passage of the corresponding cam shafts and their associated cams.

FIG. 6 shows the required input cams, namely $A_U$ and $B_F$, together with three interlock cams I and input lever 144, all of which are spatially arranged on split tube 140. Arrow 226 in FIG. 6 denotes that input cam shaft split tube 140 can move laterally in order to permit shifting each of the five transmission shift gates (254–258) shown in FIG. 4, with these gates being indicated in FIG. 6. However, input cam shaft split tube 140, in FIG. 6, is aligned with the 4–5 shift gate position wherein cam $A_U$ is located in the 3" shift rail, denominated by numeral 228, that serves for selecting speeds 4 and 5 via input clutch 68. At the same time, cam $B_F$ is located in a clearance cutout 134 denominated by the numeral 230, while an interlock cam I, denominated by numeral 232, is located in a shift rail 4", denominated by numeral 234, to arrest shift fork 4', and therefore input clutch 44 against movement.

Turning now to the right end portion of FIG. 5, there can be seen the foreshortened end portions of multiples of output shift rails 1" and 2", together with their associated cam follower notch designations, as well as the designations of the speeds controlled by the particular shift rail. Phantom line connections between FIGS. 5 and 7 show the interactions of the various shift rails and cams. Similar to FIG. 6, FIG. 7 shows the required output cams, namely $A_{UL}$, $B_F$ and $B_R$, together with two interlock cams I and output lever 148, all of which are spatially arranged on split tube 142. Arrow 236 in FIG. 7 again denotes that output split tube 142 can move laterally in order to permit shifting of each of the five transmission shift gates shown in FIG. 4, with these gates again being indicated in FIG. 7. However, output cam shaft split tube 142, in FIG. 7, is aligned with the 4–5 speed gate portion, wherein cam $B_R$ is located in the 1" shift gate, denominated by numeral 238 that serves for selecting speeds 4 and 5 via output clutch 92. At the same time, cam $A_{UL}$ is located in clearance cutout 134 denominated by numeral 240, while an interlock cam I, denominated by numeral 242, is located in a shift rail 2", denominated by numeral 244, to arrest shift fork 2' and therefore output clutch 88, against movement. In addition, cam $B_F$ is located in the clearance cutout 134 denominated by numeral 246. It should be noted that an output shift rail 2", denominated by numeral 244, and an adjacent output rail 1", denominated by numeral 248, even though they require two-way cams $A_U$ and $A_L$, respectively, are served by a single $A_{UL}$ cam since only one of the $A'_U$ or $A'_L$ cam follower notches is used in shift rails 244 and 248.

Turning now to the operation of shift control system 98, it should be noted that system 98 must be used with a transmission which has a gear train that is characterized by at least two inputs and at least two outputs, an example of which is prior art transmission 10. The general arrangement of shift control system 98 basically consists of two sets of oscillating cams, one for the input portion of the transmission and the other for the output portion of the transmission. Both sets of cams are oscillated by motion of a hand-actuated shift lever (partially shown at 184) from a neutral position, but in a predetermined sequential order, e.g., in moving the hand lever knob forward from neutral, first the output control cams are oscillated rearward followed in sequence by the input control cams oscillating rearward. Centering the hand lever knob back to neutral oscillates the cams back to neutral, first the input cams followed by the output cams. This sequential action is provided by an interlock system generally denominated by numeral 250, which forms a portion of shift control system 98. Interlock system 250 includes differential link 172 which is actuated by lower ball 186 of shift lever 184. Differential link 172 sequentially controls input link 162, connected to split input tube 140 via input lever 144, and output link 164, connected to output split tube 142 via output lever 148. The input cams on tube 140 and the output cams on tube 142 are moved laterally right and left by opposite side or lateral motion of the knob of shift lever 184 which will ultimately be used to select different rails to provide the proper motion to the various shift forks in the transmission in the manner already indicated. Sequential interlock pin 192, when shifting from neutral, always permits initial movement of the output cams followed by the input cams, with this procedure being reversed when moving shift lever 184 back to neutral. It should be understood that the mentioned sequential order, i.e., output cams followed by input cams, is not mandatory and may be reversed, depending on the basic transmission design. Furthermore, the cam shafts need not be restricted to being either input or output cam shafts exclusively, but a single cam shaft could also be used to operate both input and output rails. It should also be clear at this time that lateral or transverse motion of shift lever 184 permits selection of the proper shift gate, and therefore the desired shift rail while axial or longitudinal movement of shift lever 184 then axially moves this shift rail to select one of the two transmission settings controlled via this shift gate.

As previously noted, a two-way or A cam will move a shift rail in one direction and return it to neutral as the shift lever is moved in one direction then returned to neutral, with this direction being reversible by moving the cam follower notch from a top to a bottom position or vice versa for use with $A_U$ or $A_L$ cams. One-way or B cams are unidirectional cams that can be actuated clockwise or counterclockwise since there are both upper and lower cam surfaces; however, regardless of the direction of actuation, the cam will always move in the same direction, and a subsequent centering always brings the shift rail back to neutral. Basically, a B cam can change a double oscillating motion into a single linear motion. This type of motion is necessary, for example, when shifting from 4th to 5th, where output clutch 92 is used for both gear settings. Thus, when shifting from a neutral position 252 in FIG. 4 to 4th gear, or when shifting from neutral to 5th gear, in both instances shift fork 1' and shift rail 238 (FIG. 5) will move to the rear, although in the 4th gear actuation the input is in one direction, whereas in the 5th gear actuation the input is in the other direction. Therefore, regardless as to whether the input is clockwise or counterclockwise, one-way cam $B_R$ will move its associated shift rail to the rear. Again, depending on the direction of the required shift rail movement, either $B_F$ or $B_R$ cams can be utilized.

Interlock or I cams are utilized to abut the opposing sides of the cam follower surfaces of the shift rails of the nonselected ones of the at least two input and at least two output clutches.

By combining these three types of cams with a sufficient number of shift rails, almost any desired shift pattern may be obtained, an example only of which has been illustrated herein with reference to known nine speed forward and three speed reverse transmission 10.

The shift control system of this invention finds utility in at least two types of transmission operation. The first of these is with a transmission that is fully synchronized. In this type of operation, the initial phase of the shift (usually the output portion of the transmission) will synchronize only some parts within the transmission, and in the lower gears, only a part of the reduction ratio. This results in easy shifting. The final part of the shift (usually the input portion of the transmission) synchronizes the clutch, but again it is only a part of the total gear ratio, so that the shifting is again easy. This easy shifting more than compensates for the decreased mechanical advantage on the shift lever that is necessitated by the sequential shift.

The shift control system of this invention also finds utility in transmissions where a large number of speeds are used in a heavy vehicle and the operation of a heavy clutch pedal becomes a burden to the operator. In this second type of operation, the last portion of the shift (regardless of whether it is the input or output portion of the transmission) is not synchronized but rather has relatively coarse, flat-ended clutching teeth which will not engage unless nearly synchronized. In this type of operation, the shift fork, instead of being rigidly attached to the shift rail, is axially movable on the rail but urged to a normal position by a preloaded spring. The in-gear detent must be strong enough to hold the rail in position against the force of the preloaded spring, with the actual shift not taking place until the operator synchronizes the engine by manipulation of the throttle. A similar type of preloading is disclosed in U.S. Pat. No. 2,839,940 to A. C. Bryan which issued on 24 June 1958. The shift itself can be made quieter and smoother by adding a blocking ring which holds the engaging teeth a small distance away from each other when they are not synchronized, but unblocks them when the operator has manipulated the engine through synchronous speed. A shift blocker mechanism of this type is set forth in my prior art U.S. Pat. No. 4,027,756 which issued on 7 June 1977. However, this type of blocker cannot be used for ratios that are used for engaging a clutch when the vehicle is completely stationary.

From the foregoing, it is believed that those familiar with the art will readily recognize and appreciate the novel concepts and features of the present invention, and it is thought that the invention will have been clearly understood from the foregoing detailed description of my now-preferred illustrated embodiment. Obviously, while the invention has been described in relation to only one preferred embodiment, numerous variations, changes and substitutions of equivalents will present themselves to persons skilled in the art and may be made without necessarily departing from the scope and principles of this invention. As a result, the embodiment described herein is subject to various modifications, changes and the like, without departing from the scope and spirit of the invention. Consequently, the scope of this invention should be determined solely by reference to the claims appended hereto.

What is claimed is:

1. In combination with a speed change transmission having a gear train that is characterized by having at least two inputs and at least two outputs and having pluralities of input and output shift rails to effect speed changes; transmission control comprising;
   a. an axially movable and oscillatable shaft;
   b. a two-way cam member;
   c. a one-way cam member;
   d. an interlocking member, with all of said members being selectively spatially arranged on said shaft so as to slide and oscillate in unison therewith, said members being adapted to cooperate with said input and output shift rails;
   e. every input and output shift rail having a cutout in alignment with said shaft so as to permit passage therethrough of said shaft;
   f. a two-way cam follower surface in at least one of said cutouts adapted to cooperate with said two-way cam member to effect axial movement of the respective shift rails in one direction upon clockwise oscillation of said two-way cam member and alternately to effect axial movement in an opposite direction upon counterclockwise rotation of said two-way cam member, said two-way cam follower surface also being adapted to alternately cooperate with said interlocking member to arrest the cooperating shift rail against axial movement upon oscillation of said members;
   g. a one-way cam follower surface in at least one other of said cutouts adapted to cooperate with said one-way cam member to effect axial movement of the respective shift rails in one and the same direction upon both clockwise and counterclockwise oscillation of said one-way cam member, said one-way cam follower surface also being adapted to alternately cooperate with said interlocking member to arrest said cooperating shift rail against axial movement upon oscillation of said members;
   h. means for actuating, via sliding and oscillating, all of said members by motion of a hand-actuated shift lever; and
   i. said plurality of input and output shift rails being arranged so that said interlocking member cooperates with a nonselected one of the input and output shift rails.

2. The transmission control system of claim 1 wherein said one-way cam member includes substantially similar vertically opposed cam operating surfaces, each of which has a tooth portion and a cam end surface.

3. The transmission control system of claim 2 wherein said one-way cam follower surface includes substantially similar vertically opposed cam follower notches, with each notch in turn having a shift rail advancing surface and a shift rail disengaging surface.

4. The transmission control system of claim 3 wherein the center points of said cam end surfaces and the leading edges of said tooth portions are offset relative to a vertical center line of said shaft in order to permit interaction of said cam end surface with respect to said shift rail disengaging surface.

5. The transmission control system of claim 4 wherein said one-way cam member and said one-way cam follower surfaces are symmetrical about a horizontal plane containing the axis of said shaft.

6. The transmission control system of claim 4 wherein each one-way cam follower surface includes opposed side surfaces that are adapted to cooperate with said interlocking member in the absence of said one-way cam member.

* * * * *